(12) United States Patent
Park et al.

(10) Patent No.: US 7,273,682 B2
(45) Date of Patent: Sep. 25, 2007

(54) SOLID ELECTROLYTE, METHOD FOR PREPARING THE SAME, AND BATTERY USING THE SAME

(75) Inventors: Young-sin Park, Gyeonggi-do (KR); Jong-heun Lee, Gyeonggi-do (KR); Young-gu Jin, Gyeonggi-do (KR); Seok-soo Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 724 days.

(21) Appl. No.: 10/757,500

(22) Filed: Jan. 15, 2004

(65) Prior Publication Data

US 2004/0151986 A1 Aug. 5, 2004

(30) Foreign Application Priority Data

Jan. 30, 2003 (KR) .................. 10-2003-0006288

(51) Int. Cl.
*H01M 6/18* (2006.01)
(52) U.S. Cl. .................. 429/322; 429/321; 429/304; 252/62.2
(58) Field of Classification Search ................ 429/304, 429/321, 322; 252/62.2
See application file for complete search history.

(56) References Cited

U.S. PATENT DOCUMENTS

| 4,184,015 A | 1/1980 | Reau et al. |
|---|---|---|
| 4,876,628 A | 10/1989 | Goldner et al. |
| 5,202,201 A | 4/1993 | Meunier et al. |
| 5,338,625 A | 8/1994 | Bates et al. |

FOREIGN PATENT DOCUMENTS

EP 0049 145 A1 4/1982

OTHER PUBLICATIONS

P. Birke et al., Materials for Lithium Thin-Film Batteries for Application in Silicon Technology, Solid State Ionics, 1997, pp. 1-15, 93, Elsevier Science B.V., Germany.
*1. Nam-Seok Roh et al., "Effects of Deposition Condition on the Ionic Conductivity and Structure of Amorphous Lithium Phosphorus Oxynitrate Thin Film" Scripta Materialia, Elsevier, New York, NY, US, vol. 42, No. 1, Dec. 17, 1999, pp. 43-49, XP004325885, ISSN: 1359-6462.
*2. H. Ohtsuka et al., "Application of $Li_2O$-$V_2O_5$-$SiO_2$ Solid Electrolyte Film To a Rechargeable Lithium Battery" Progress in Batteries and Solar Cells, JEC Press Inc., Cleveland, US., vol. 8, 1989, pp. 108-112, XP000258176.
*3. P. Birke et al., "Materials for Lithium Thin-Film Batteries for Application in Silicon Technology" Solid State Ionics, North Holland Pub. Company, Amsterdam, NL, vol. 93, No. 1, Dec. 1, 1996, pp. 1-15, XP004053089, ISSN: 0167-2738.
*Korean Office Action, dated Jan. 24, 2005, and English translation.

*Primary Examiner*—Laura Weiner
(74) *Attorney, Agent, or Firm*—Buchanan Ingersoll & Rooney PC

(57) ABSTRACT

A solid electrolyte including a composition represented by Formula 1 below is provided: $aLi_2O$-$bB_2O_3$-$cM$-$dX$ (1) wherein M is at least one selected from the group consisting of $TiO_2$, $V_2O_5$, $WO_3$, and $Ta_2O_5$; X is at least one selected from LiCl and $Li_2SO_4$; $0.4<a<0.55$; $0.4<b<0.55$; $0.02<c<0.05$; $a+b+c=1$, and $0 \leq d<0.2$. A method for preparing the solid electrolyte and a battery using the solid electrolyte are also provided. The solid electrolyte exhibits high ionic conductivity. Lithium and thin film batteries using the solid electrolyte are improved in charge/discharge rate, power output, and cycle life.

9 Claims, 4 Drawing Sheets

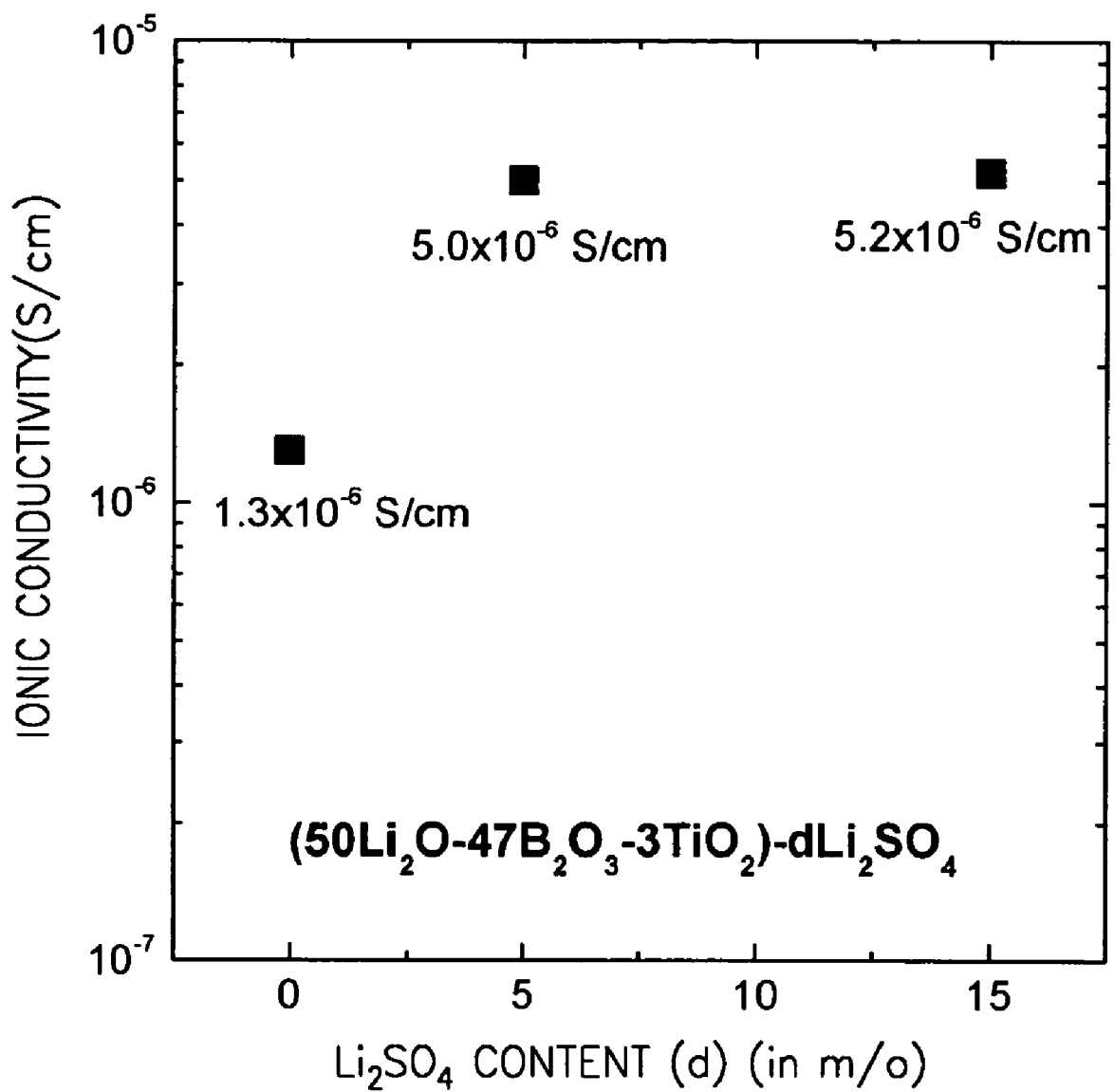

SOLID ELECTROLYTE, METHOD FOR PREPARING THE SAME, AND BATTERY USING THE SAME

BACKGROUND OF THE INVENTION

This application claims priority from Korean Patent Application No. 2003-6288, filed on Jan. 30, 2003, in the Korean Intellectual Property Office, the disclosure of which is incorporated herein by reference in its entirety.

Field of the Invention

The present invention relates to a solid electrolyte, a method for preparing the same, and a battery using the same. More particularly, the present invention relates to a solid electrolyte, which is improved in ionic conductivity and electrochemical stability, a method for preparing the same, and a lithium battery or a thin film battery using the same.

Description of the Related Art

Rapid advancement of computer technology and mobile communication has brought an information revolution, and thus, development of information equipment is rapidly advancing toward digitalization, miniaturization, and multimedia application. As energy sources for representative portable information equipment such as notebook computers, personal digital assistants (PDAs), and mobile communication terminals, lithium ion batteries with lightweight and high energy density have been mainly used.

As the miniaturization of electronic equipment continues, the sizes of secondary batteries tend to determine the sizes of systems for electronic equipment. As representative examples of such systems, there are complementary metal oxide semiconductors (CMOSs), smart integrated circuit (IC) cards, micro-sensors, and micro-robots. Judging from development tendencies of semiconductor process and micro electro mechanical system (MEMS) technology, it is anticipated that thin film batteries will be used as energy sources for new generation, small-sized systems.

FIG. 1 shows a schematic structure of conventional thin film batteries. Referring to FIG. 1, thin film batteries have a fundamental structure in which a cathode 12, an electrolyte 14, and an anode 13 are sequentially laminated in the form of thin films on a collector 11, and have a total thickness of about 10 μm. For these reasons, thin film batteries have the following advantages.

Since an anode is disposed near a cathode by deposition in the form of thin film, thin film batteries have a high current density and an excellent battery efficiency. Furthermore, due to thin film formation, a distance between ions decreases, and thus, ion transfer is facilitated. Therefore, the contents of reactants can be greatly reduced. Still furthermore, thin film batteries having suitable shapes and sizes for specific purposes can be easily manufactured. Therefore, thin film batteries are promising main power sources for driving ultra small-sized electronic devices, MEMS devices, and ultra small-sized sensors.

Since fabrication of thin film batteries is carried out in the same manner as a semiconductor fabrication process, thin film batteries can be mounted together with electronic circuits on semiconductor chips. Therefore, CMOS memory chips that use thin film batteries as backup power sources can be realized. Furthermore, since thin film batteries can be formed in disused spaces of electric equipment, a space utility efficiency can be optimized. Still furthermore, various types of battery packs with various voltages and capacities can be realized by a series or parallel interconnection of batteries using an appropriate design and etching process. Therefore, thin film batteries can be used for many various purposes.

Thin film batteries require $Li^+$ ion conductors (electrolytes) of perfect solid phase, unlike conventional lithium ion batteries. There have been reported that LISICON, $Li_4SiO_4$—$Li_3PO_4$ solid solutions, $Li_2O$—$B_2O_3$—$SiO_2$, and Lipon (Lithium phosphorus oxynitride) are suitable electrolytes with regard to stability in an atmosphere.

Reports have been made on crystalline solid electrolytes with excellent $Li^+$ ionic conductivity. However, inorganic compound-based solid electrolytes with complex crystalline structure generally exhibit amorphous properties when deposited in the form of thin films, and crystallization of such thin films requires heat treatment at a high temperature. Therefore, it is impractical to utilize inorganic compound-based solid electrolytes in thin film batteries.

Meanwhile, glass electrolytes that exhibit high isotropic conductivity at an amorphous state can be more easily fabricated in the form of thin films relative to crystalline electrolytes. Also, since ionic conductivity of glassy electrolytes continuously varies depending on their compositions, it is easy to adjust film compositions upon deposition. Meanwhile, since thin film batteries have an electrode-to-electrode distance as small as several micrometers, even electrolytes with a low ionic conductivity of $10^{-7}$ S/cm can be used to fabricate effective thin film batteries. Therefore, thin film batteries can solve problems of glassy solid electrolytes that exhibit relatively low ionic conductivity.

A currently most noteworthy solid electrolyte for thin film batteries is Lipon as disclosed in U.S. Pat. No. 5,338,625 to John B. Bates et al., titled "Thin Film Battery and Method for Making Same". The Lipon is formed in the form of thin film by radio frequency sputtering of $Li_3PO_4$ target under nitrogen atmosphere. The Lipon thin film exhibits high ionic conductivity of $2(\pm 1) \times 10^{-6}$ S/cm at room temperature. In particular, since the Lipon thin film forms a very stable interface with cathode or anode, battery deterioration during operation remarkably decreases. Therefore, it has been reported that the Lipon thin film satisfies most requirements for solid electrolytes for thin film batteries. However, the properties of the Lipon thin film greatly varies depending on process variables for thin film formation. For this reason, reproducibility becomes poor [P. Birke et al., Materials for thin film batteries for application in silicon technology, Solid State Ionics 93 (1997) 1-15], and thus, it is difficult to achieve mass production of the Lipon thin film.

Meanwhile, U.S. Pat. No. 4,184,015 discloses a solid electrolyte comprising a composition represented by the following formula:

$(B_2O_3, xM, yN)$-$aLi_2O$-$bLiQ$ wherein, M is selected from the group consisting of $Al_2O_3$, $V_2O_5$, $P_2O_5$, $As_2O_5$, and $As_2O_3$, N is selected from $SiO_2$ and $GeO_2$, Q is selected from the group consisting of F, Cl, Br, S, $SO_4$, $MoO_4$, $WO_4$, N, and $PO_4$, $0 \leq x \leq 0.35$, $0 \leq y \leq 0.8$, $0 < a \leq 0.2$, and $b \leq 2a$.

However, the above solid electrolyte exhibits good ionic conductivity only at a high temperature of 100° C. or above. For this reason, there is a problem in that a battery using the above solid electrolyte exhibits poor battery properties when operated at room temperature.

Therefore, in order to develop thin film batteries as energy sources for 21 century's leading ultra small-sized systems, development of new glassy solid electrolytes that exhibit high ionic conductivity at room temperature and can be substituted for Lipon is necessary.

SUMMARY OF THE INVENTION

The present invention provides an oxide-based glassy solid electrolyte with high ionic conductivity that can realize high capacity batteries which are improved in charge/discharge rate, power output, and cycle life, and a method for preparing the same.

The present invention also provides a lithium battery and a thin film battery using the solid electrolyte.

According to an aspect of the present invention, there is provided a solid electrolyte comprising a composition represented by Formula 1 below:

$$a\text{Li}_2\text{O}\text{-}b\text{B}_2\text{O}_3\text{-}c\text{M-}d\text{X} \qquad \text{Formula 1}$$

wherein M is at least one selected from the group consisting of $TiO_2$, $V_2O_5$, $WO_3$, and $Ta_2O_5$;

X is at least one selected from LiCl and $Li_2SO_4$;

$0.4<a<0.55$; $0.4<b<0.55$; $0.02<c<0.05$; $a+b+c=1$, and $0 \leq d<0.2$.

Preferably, a may be in the range of 0.45 to 0.52, b may be in the range of 0.45 to 0.52, c may be in the range of 0.03 to 0.04, and d may be in the range of 0.001 to 0.15.

According to another aspect of the present invention, there is provided a method for preparing the solid electrolyte comprising the composition represented by Formula 1, the method comprising: (a) mixing a $Li_2O$ precursor compound; $B_2O_3$; and at least one compound selected from the group consisting of $TiO_2$, $V_2O_5$, $WO_3$, and $Ta_2O_5$, followed by milling; (b) heating the resultant powder mixture so that the $Li_2O$ precursor compound is thermally decomposed into $Li_2O$; (c) heating the resultant mixture to obtain a uniformly molten glass; and (d) quenching the molten glass to obtain a glassy solid electrolyte.

In step (b), $Li_2O$ may be decomposed from the $Li_2O$ precursor compound at a temperature of 600 to 800° C. In step (c), the molten glass may be obtained at a temperature of 900 to 1,500° C. In step (d), the molten glass may be quenched at a temperature of 0 to 25° C.

At least one compound selected from LiCl and $Li_2SO_4$ may be added to the powder mixture of step (a) in the amount of 0 to 20 mole %, preferably 0.1 to 15 mole %, based on 100 mole % of the powder mixture of step (a).

According to another aspect of the present invention, there is provided a lithium battery using the solid electrolyte comprising the composition represented by Formula 1.

According to yet another aspect of the present invention, there is provided a thin film battery using the solid electrolyte comprising the composition represented by Formula 1.

BRIEF DESCRIPTION OF THE DRAWINGS

The above and other features and advantages of the present invention will become more apparent by describing in detail exemplary embodiments thereof with reference to the attached drawings in which:

FIGS. 3A through 3C are graphs showing ionic conductivities of lithium salt-containing, glassy solid electrolytes prepared according to Example 11 of the present invention.

DETAILED DESCRIPTION OF THE INVENTION

Figure 1:
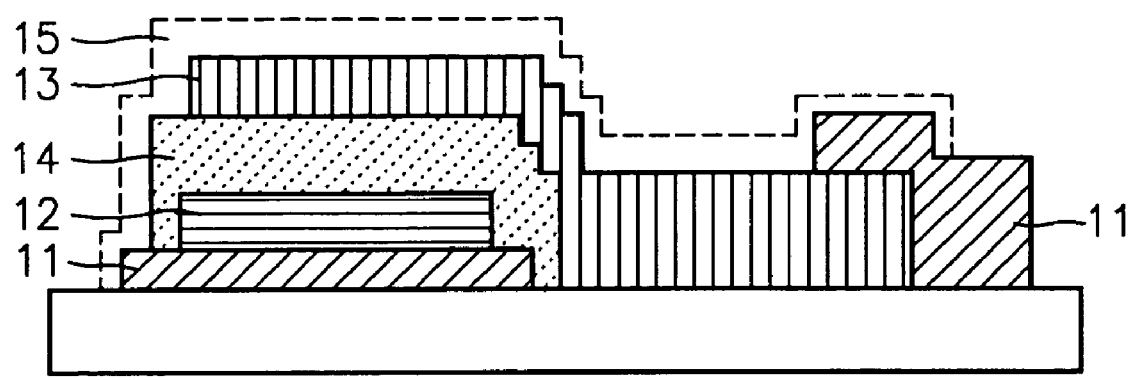
FIG. 1 is a schematic view of the structure of a conventional thin film battery.

Hereinafter, a solid electrolyte of the present invention will be described in detail.

A solid electrolyte of the present invention comprises a composition represented by Formula 1 below:

$$a\text{Li}_2\text{O}\text{-}b\text{B}_2\text{O}_3\text{-}c\text{M-}d\text{X} \qquad \text{Formula 1}$$

wherein M is at least one selected from the group consisting of $TiO_2$, $V_2O_5$, $WO_3$, and $Ta_2O_5$;

X is at least one selected from LiCl and $Li_2SO_4$;

$0.4<a<0.55$; $0.4<b<0.55$; $0.02<c<0.05$; $a+b+c=1$, and $0 \leq d<0.2$.

Generally, a network former is a material that can by itself form a glass, such as oxides of silicon (Si), phosphorus (P), boron (B), germanium (Ge), and arsenic (As), and a chalcogenide compound. A glass phase is a state that oxygen polyhedrons comprising the network former ions are interlinked to each other to form a chain structure. Unlike a crystalline phase, in a glass phase, covalent bond angles and distances can be changed and ionic conductivity is low due to strong covalent bonds.

A network modifier has a strong ionic bond characteristic, and, therefore, cannot form a glass phase by itself. However, in case of using it together with a network former, a network modifier can induce a structural change of a network former by breaking bonds between oxygen and two cations in a network former and then ionically bonding with two cations. As the amount of a network modifier increases, the distance between two adjacent anions decreases, and thus, the height of a potential barrier decreases. Therefore, addition of a network modifier is advantageous in terms of ionic conduction.

A solid electrolyte of the present invention essentially comprises $B_2O_3$ as a network former, $Li_2O$ as a network modifier, and at least one selected from the group consisting of $TiO_2$, $V_2O_5$, $WO_3$, and $Ta_2O_5$ as an oxide for enhancing the ionic conductivity of $Li^+$.

According to the present invention, $B_2O_3$ is used as a network former. When $Li_2O$ as a network modifier is added to $B_2O_3$, two non-bridging oxygen (NBO) are generated. At this time, two $Li^+$ ions are positioned near the non-bridging oxygen to satisfy an electrical neutrality condition. As a result, the connectivity of $B_2O_3$ polyhedron is reduced, thereby causing the reduction of viscosity and the lowering of glass transition temperature.

A change of a glass structure by addition of $Li_2O$ is more important from a viewpoint of ionic conductivity. Network modifier ions have much higher mobility than network former ions that are covalently bonded to each other to form a network. For this reason, conduction is caused mainly by network modifier ions. With regard to both of mobility of $Li^+$ ions and a local neutrality condition, movement of $Li^+$ ions upon application of electric field might be explained by $Li^+$ ion hopping between non-bridging oxygen. In this regard, in order to enhance ionic conductivity of a glassy solid electrolyte, it is necessary to increase the concentration of charge carriers and reduce an activation energy for conduction.

When $Li_2O$ is used as a network modifier, a significant increase in conductivity relative to the added amount of $Li_2O$ can be observed. An example thereof is presented in Table 1 of Examples as will be described later. This may be because $Li_2O$ significantly breaks strong covalent bonds in a glass network, as well as providing $Li^+$ ions for conduction. An activation energy for conduction is the sum of two items: a strain energy determined by the sizes of gaps in a glass network when Li$^+$ ions moves between non-bridging oxygen and an electrostatic energy determined by electrostatic attractive and repulsive forces generated when Li$^+$ ions passes through a glass network comprised of cations and anions.

In this regard, in order to enhance ionic conductivity of Li$^+$ ions, it is most important to control the spatial and electrostatic structure of a glass network. According to the present invention, another oxide such as $TiO_2$, $V_2O_5$, $WO_3$, and $Ta_2O_5$ is used to enhance the ionic conductivity of Li$^+$ ions.

When another oxide such as $TiO_2$, $V_2O_5$, $WO_3$, and $Ta_2O_5$ is added to a $Li_2O$—$B_2O_3$-based solid electrolyte, a glass network can have a more opened structure. As a result, an activation energy can be reduced and thus ionic conductivity can be enhanced.

More specifically, in the present invention, addition of a third oxide such as $TiO_2$, $V_2O_5$, $WO_3$, and $Ta_2O_5$ to a $Li_2O$—$B_2O_3$-based solid electrolyte is to modify glass structure to enable ionic conduction to be facilitated. A structural change of a glass network by addition of the third oxide can be explained by an ionic potential (Z/r) obtained from ionic charge (Z) divided by ionic radius (r). A pure glass network without the third oxide is balanced by random array of covalent bonded polyhedrons. However, as an ionic potential of the third oxide increases, an electrostatic effect on neighboring ions increases, and thus, balance of a glass network is greatly broken. As a result, a structural change of a glass network greatly occurs.

A solid electrolyte of the present invention is prepared by adding a third additive such as $TiO_2$, $V_2O_5$, $WO_3$, and $Ta_2O_5$ to a $Li_2O$—$B_2O_3$-based solid electrolyte A solid electrolyte of the present invention may further comprise at least one lithium salt compound selected from the group consisting of LiCl and $Li_2SO_4$.

In Formula 1, $0.4<a<0.55$; $0.4<b<0.55$; $0.02<c<0.05$; $a+b+c=1$, and $0 \leq d<0.02$.

Preferably, a is in the range of 0.45 to 0.52, b is in the range of 0.45 to 0.52, c is in the range of 0.03 to 0.04, and d is in the range of 0.001 to 0.15.

In a solid electrolyte of the present invention, if the molar ratio of $Li_2O$, i.e., the value of a is 0.4 or less, the concentration of movable Li$^+$ ions is too low, and thus, ionic conductivity is significantly reduced to $10^{-7}$ S/cm or less. On the other hand, if the value of a is 0.55 or more, a glass structure may be excessively broken, thereby causing phase separation of a glass. Also, partial or whole crystallization may occur, thereby making it impossible to form a glass phase.

If the molar ratio of $B_2O_3$, i.e., the value of b is 0.4 or less, the amount of $B_2O_3$ intended for forming a glass phase may be too low, and thus, a glass phase cannot be formed. On the other hand, if the value of b is 0.55 or more, the amount of $Li_2O$—$B_2O_3$ that contributes to ionic conduction decreases, and thus, ionic conductivity is lowered.

In Formula 1, M is at least one selected from $TiO_2$, $V_2O_5$, $WO_3$, and $Ta_2O_5$, which are added as a third compound. If the molar ratio of M, i.e., the value of c is 0.02 or less, an addition effect is insignificant. On the other hand, if the value of c is 0.05 or more, crystallization may occur. This may be because $TiO_2$, $V_2O_5$, $WO_3$, and $Ta_2O_5$ have a large ionic potential.

A solid electrolyte of the present invention may further comprise a lithium salt. The lithium salt serves to enhance ionic conductivity of a solid electrolyte. In this case, if the molar ratio of the lithium salt, i.e., the value of d is 0.2 or more, a glass structure may be excessively broken, thereby causing phase separation of a glass. Also, partial or whole crystallization may occur by agglomeration of the lithium salt itself, thereby making it impossible to form a glass phase.

Hereinafter, a method for preparing a solid electrolyte of the present invention will be described in detail. A solid electrolyte of the present invention can be prepared by (a) mixing a $Li_2O$ precursor compound; $B_2O_3$; and at least one compound selected from the group consisting of $TiO_2$, $V_2O_5$, $WO_3$, and $Ta_2O_5$, followed by milling; (b) heating the resultant powder mixture so that the $Li_2O$ precursor compound is thermally decomposed into $Li_2O$; (c) heating the resultant mixture to obtain a uniformly molten glass; and (d) quenching the molten glass to obtain a glassy solid electrolyte.

Since $Li_2O$ is unstable at room temperature, $Li_2CO_3$ that is stable at room temperature is used as a raw material. $Li_2CO_3$, $B_2O_3$, and at least one compound selected from the group consisting of $TiO_2$, $V_2O_5$, $WO_3$, and $Ta_2O_5$, all of which are in powder forms, are weighed and mixed, followed by ball milling. In step (a), in order to enhance conductivity of Li$^+$, at least one compound selected from powdery LiCl and $Li_2SO_4$ may be further mixed with the powder mixture, followed by ball milling.

Preferably, in step (b), $Li_2O$ can be decomposed from $Li_2CO_3$ at a temperature of 600 to 800° C. $Li_2CO_3$ is subjected to thermolysis by heating at 600 to 800° C. for 30 minutes to 1 hour and 30 minutes. At this time, $CO_2$ is removed from $Li_2CO_3$.

Preferably, in step (c), the molten glass can be obtained at a temperature of 900 to 1,500° C. The mixture obtained in step (b) is heated at a temperature from 900 to 1,500° C. with gradual temperature increase to obtain the molten glass. Whether or not glass formation is observed with gradual temperature increase until a minimum temperature at which the molten glass can be formed is reached. In this case, if the molten glass is formed at too high temperature, a lithium component in the molten glass may be evaporated, and thus, the compositional change of the molten glass may occur. Therefore, it is preferable to form the molten glass at a temperature as low as possible.

The glassy solid electrolyte can be obtained by quenching the molten glass. Preferably, in step (d), the molten glass is quenched at a temperature of 0 to 25° C.

Hereinafter, a lithium battery and a thin film battery using a solid electrolyte according to the present invention will be described in detail.

A lithium battery of the present invention can be obtained by introducing a solid electrolyte of the present invention into the structure of a conventional lithium battery.

A method for preparing a lithium battery using a solid electrolyte of the present invention will now be described.

First, a cathode active material such as vanadium oxide ($V_2O_5$), lithium-manganese oxide ($LiMn_2O_4$), lithium-cobalt oxide ($LiCoO_2$), and lithium-nickel oxide ($LiNiO_2$) is coated on a cathode collector and dried to form a cathode active material layer. As a result, a cathode comprised of the cathode active material layer is prepared. On the other hand, an anode active material such as lithium metal, lithium alloy, and graphite is roll-pressed on an anode collector to form an anode active material layer. As a result, an anode comprised of the anode active material layer is prepared. A solid electrolyte of the present invention is interposed between the cathode and the anode thus prepared and then sealed under a vacuum condition to thereby obtain a lithium secondary battery.

A thin film battery of the present invention can be obtained by introducing a solid electrolyte of the present invention into the structure of a conventional thin film battery.

A method for preparing a thin film battery using a solid electrolyte of the present invention will now be described with reference to FIG. 1.

First, a cathode active material such as vanadium oxide ($V_2O_5$), lithium-manganese oxide ($LiMn_2O_4$), lithium-cobalt oxide ($LiCoO_2$), and lithium-nickel oxide ($LiNiO_2$) is vapor-deposited on the collector 11 to form the cathode 12 in the form of a thin film. On the cathode 12, a solid electrolyte of the present invention is vapor-deposited to form the solid electrolyte layer 14. Finally, an anode active material such as lithium metal, lithium alloy, silicon alloy, and tin alloy is deposited by thermal deposition or sputtering process to form the anode 13. This completes a thin film battery of the present invention. The thin film battery may comprise the protective layer 15 thereon.

Hereinafter, the present invention will be described with reference to the following examples but is not limited thereto.

EXAMPLES 1-4 AND COMPARATIVE EXAMPLES 1 AND 2

$Li_2CO_3$ as a $Li_2O$ precursor that is stable at room temperature, $B_2O_3$, and $TiO_2$ were weighed according to glass compositions presented in Table 1 below, followed by ball milling using ethanol for 20 hours. Then, the resultant powder mixtures were stirred and dried on a hot plate.

Figure 2:
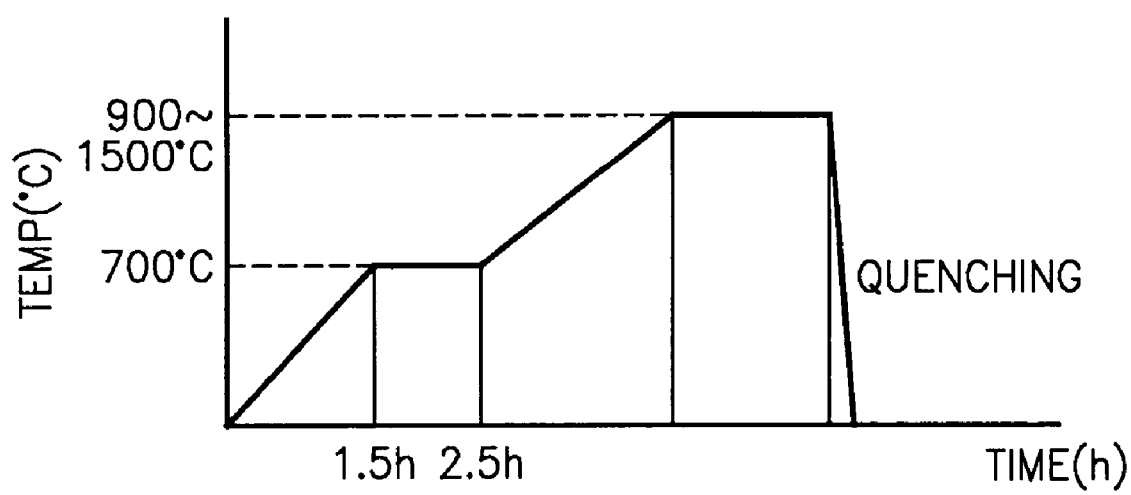
FIG. 2 is a graph of temperature profile for glassy electrolyte preparation according to the present invention.

The powder mixtures thus prepared were loaded in platinum crucibles (50 cc each) and heated according to the temperature profile shown in FIG. 2. In this case, the temperature of the mixture was maintained at 700° C. for 1 hour due to decomposition of $Li_2CO_3$ into $Li_2O$. Then, whether or not formation of molten glasses was observed with increasing temperature from 900 to 1,500° C. by about 100° C. until a minimum temperature at which the molten glasses can be formed was reached. At this time, if the molten glasses are formed at too high temperature, lithium components in the molten glasses may be evaporated, and thus, the compositional change of the molten glasses may occur. In this regard, the molten glasses were formed at a temperature as low as possible.

When it was judged that the molten glass had sufficient transparency and viscosity, the molten glass-containing crucibles were rapidly removed from an elevator box furnace and the molten glasses were then poured into stainless molds of hexahedral shapes. In this case, a time required until the molten glasses were molded after unloaded from the elevators was about 5 to 7 seconds. With regard to dissipation property of stainless, it cannot be said that such a quenching rate of the molten glasses is sufficiently rapid. Some molten glasses were crystallized due to insufficient quenching rate. In this case, a quenching rate of the molten glasses for glass formation was facilitated by putting molten glass-containing crucibles into water without using a stainless mold.

Transparency of glasses recovered after the quenching was observed to identify phase separation of the glasses. Transparent glasses with no phase separation were processed into glass plates with a thickness of 1 mm and then surface polished with up to 3,000 grit sandpaper. Ring type electrodes were made by screen printing an Ag paste on both surfaces of each of the glass plates and then dried in a drying machine of 100° C. for 2 hours to thereby form battery specimens.

The complex impedances of the battery specimens thus prepared were measured using a SI 1260 impedance/gain-phase analyzer (Model No. SI 1260, Solartron, Inc., Farnborough, U.K.). Ionic conductivities of the glass plates were determined from the sizes of impedance semicircles. Degree of crystallization of the glass plates was determined by X-ray diffraction analysis.

Ionic conductivities of the respective solid electrolytes of Examples and Comparative Examples, which are different in the contents of $Li_2O$, $B_2O_3$, and $TiO_2$, are presented in Table 1 below.

TABLE 1

| Specimens | Composition (mole %) | | | Ionic conductivity (S/cm) |
|---|---|---|---|---|
| | $Li_2O$ | $B_2O_3$ | $TiO_2$ | |
| Comparative 1 | 40 | 55 | 5 | $5.2 \times 10^{-8}$ |
| Example 1 | 45 | 52 | 3 | $2.6 \times 10^{-7}$ |
| Example 2 | 48 | 49 | 3 | $3.7 \times 10^{-7}$ |
| Example 3 | 50 | 47 | 3 | $1.3 \times 10^{-6}$ |
| Example 4 | 52 | 45 | 3 | $1.0 \times 10^{-6}$ |
| Comparative 2 | 55 | 40 | 3 | Crystallized |

Comparative: Comparative Example

As seen from Table 1, in the solid electrolytes of Examples 1 to 4, as the content of $Li_2O$ increased, ionic conductivity increased. The solid electrolyte of Example 3 comprising a composition of $Li_2O/B_2O_3/TiO_2=50/47/3$ exhibited the highest ionic conductivity of about $1.3 \times 10^{-6}$ S/cm. When the content of $TiO_2$ was 5 mole % or more in the total molar composition, no transparent glass phases were obtained. As a result of X-ray diffraction analysis, $TiO_2$ crystalline phases were observed.

EXAMPLES 5-7 AND COMPARATIVE EXAMPLES 3 AND 4

Glassy solid electrolytes were prepared in the same manner as in Example 1 except that $V_2O_5$ as a raw material was used instead of $TiO_2$. Ionic conductivities of the glassy solid electrolytes with varying compositions are presented in Table 2 below.

TABLE 2

| Specimens | Composition (mole %) | | | Ionic conductivity (S/cm) |
|---|---|---|---|---|
| | $Li_2O$ | $B_2O_3$ | $V_2O_5$ | |
| Comparative 3 | 40 | 55 | 5 | $1.5 \times 10^{-9}$ |
| Example 5 | 42 | 55 | 3 | $1.0 \times 10^{-7}$ |
| Example 6 | 45 | 52 | 3 | $1.7 \times 10^{-7}$ |
| Example 7 | 47 | 50 | 3 | $1.1 \times 10^{-6}$ |
| Comparative 4 | 55 | 40 | 5 | Crystallized |

Comparative: Comparative Example

As seen from Table 2, in the solid electrolytes of Examples 5 to 7, as the content of $Li_2O$ was increased, ionic conductivity was increased. The solid electrolyte comprising a composition of $Li_2O/B_2O_3/V_2O_5=47/50/3$ exhibited the highest ionic conductivity of about $1.1 \times 10^{-6}$ S/cm. In this case, solid electrolytes with partial glass phases were obtained until the content of $V_2O_5$ reached 8 mole %, but the obtained solid electrolytes exhibited very low ionic conductivities.

EXAMPLES 8-10 AND COMPARATIVE EXAMPLES 5 AND 6

Glassy solid electrolytes were prepared in the same manner as in Example 1 except that $WO_3$ as a raw material was used instead of $TiO_2$. Ionic conductivities of the glassy solid electrolytes with varying compositions are presented in Table 3 below.

TABLE 3

| Specimens | Composition (mole %) | | | Ionic conductivity (S/cm) |
|---|---|---|---|---|
| | $Li_2O$ | $B_2O_3$ | $WO_3$ | |
| Comparative 5 | 40 | 55 | 5 | Crystallized |
| Example 8 | 42 | 55 | 3 | $2.8 \times 10^{-7}$ |
| Example 9 | 47 | 50 | 3 | $5.2 \times 10^{-7}$ |
| Example 10 | 50 | 47 | 3 | $1.5 \times 10^{-7}$ |
| Comparative 6 | 55 | 42 | 3 | $4.0 \times 10^{-9}$ |

Comparative: Comparative Example

As seen from Table 3, the solid electrolyte of Example 9 comprising a composition of $Li_2O/B_2O_3/WO_3=47/50/3$ exhibited the highest ionic conductivity of about $5.2 \times 10^{-7}$ S/cm.

EXAMPLE 11

Figure 3B:
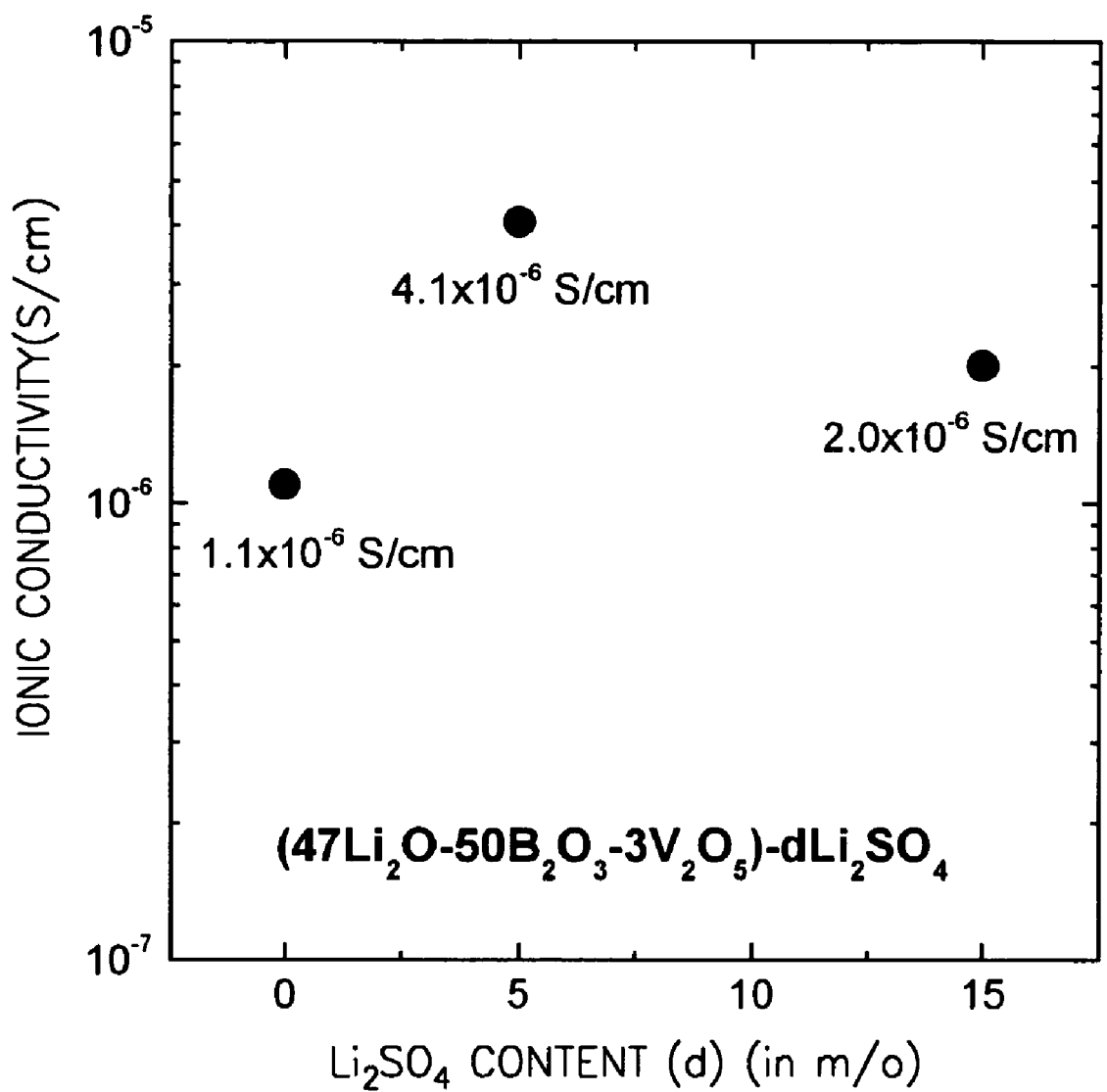
Figure 3C:
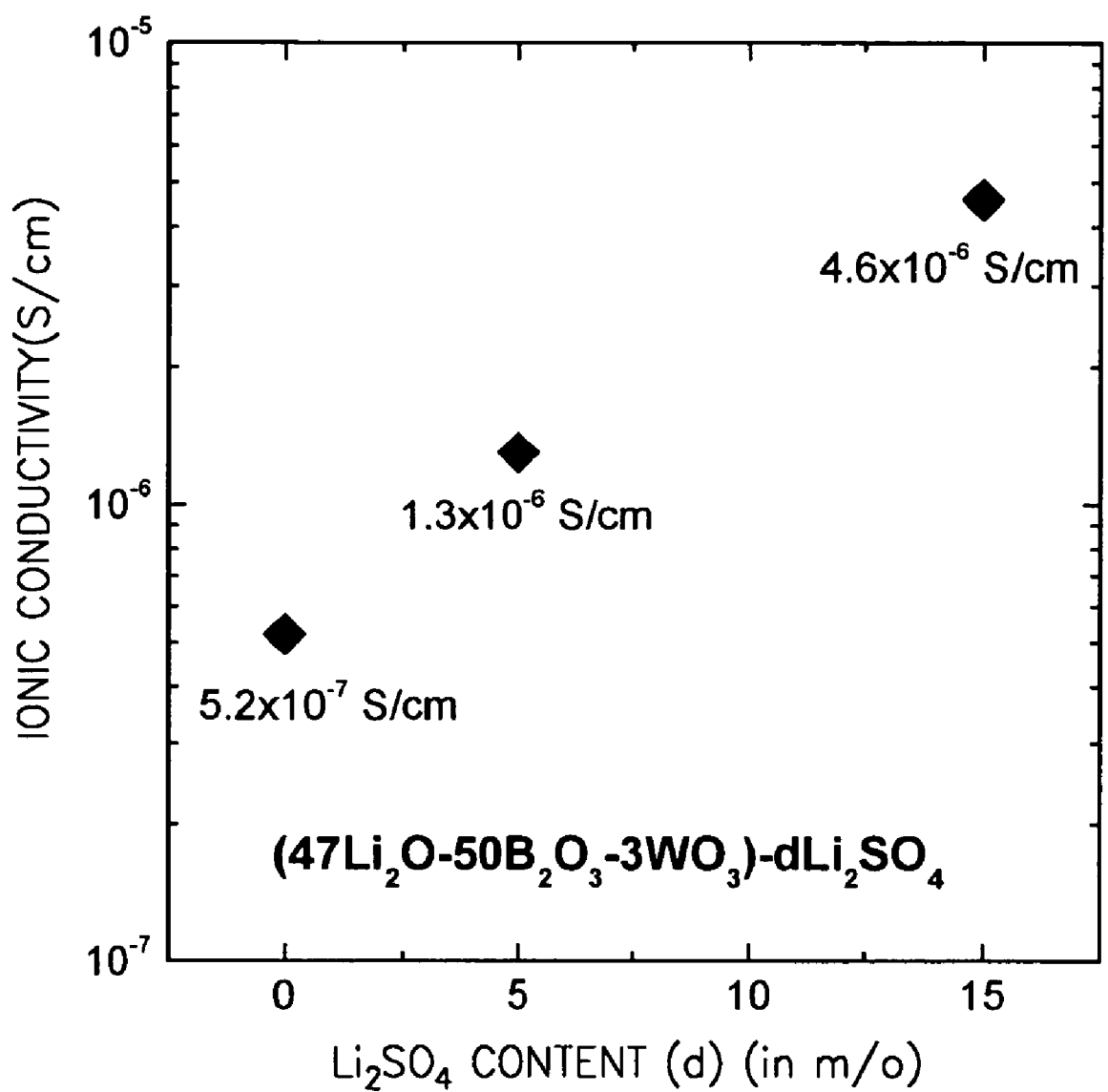

In order to further enhance ionic conductivities, a lithium salt, $Li_2SO_4$ was added to the respective compositions of the solid electrolytes of Examples 3, 7, and 9. In detail, glassy solid electrolytes were prepared in the same manner as in Example 1 except that $Li_2SO_4$ were added to the respective compositions, $Li_2O/B_2O_3/TiO_2$ (50/47/3), $Li_2O/B_2O_3/V_2O_5$ (47/50/3), and $Li_2O/B_2O_3/WO_3$ (47/50/3) of Examples 3, 7, and 9 in the amounts of 5 and 15 mole %, respectively, based on 100 mole % of each of the compositions. Changes in ionic conductivities according to the added amount of $Li_2SO_4$ are shown in FIGS. 3A through 3C. FIG. 3A shows a change in ionic conductivity according to the amount of $Li_2SO_4$ added to $Li_2O/B_2O_3/TiO_2$ (50/47/3), FIG. 3B shows a change in ionic conductivity according to the amount of $Li_2SO_4$ added to $Li_2O/B_2O_3/V_2O_5$ (47/50/3), and FIG. 3C shows a change in ionic conductivity according to the amount of $Li_2SO_4$ added to $Li_2O/B_2O_3/WO_3$ (47/50/3).

As shown in FIGS. 3A through 3C, the solid electrolytes exhibited more increased ionic conductivities by the addition of a lithium salt, $Li_2SO_4$. When $Li_2SO_4$ were added to $Li_2O/B_2O_3/TiO_2$ (50/47/3) in the amount of 15 mole %, ionic conductivity was the highest as about $5.2 \times 10^{-6}$ S/cm.

Consequently, according to the present invention, glassy solid electrolytes with greatly improved ionic conductivities relative to conventional glassy solid electrolytes can be obtained.

As apparent from the above descriptions, a solid electrolyte of the present invention exhibits excellent lithium ionic conductivity. The addition of a lithium salt to a solid electrolyte of the present invention can greatly enhance ionic conductivity. Therefore, where a solid electrolyte of the present invention is introduced into conventional lithium and thin film batteries, these batteries can have excellent charge/discharge rate and cycle characteristics, as well as enhanced life characteristics as a result of great improvement in chemical stability at interfaces between electrodes and the electrolyte.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A solid electrolyte comprising a composition represented by Formula 1 below:

$$aLi_2O\text{-}bB_2O_3\text{-}cM\text{-}dX \qquad (1)$$

wherein M is at least one selected from the group consisting of $TiO_2$, $V_2O_5$, $WO_3$, and $Ta_2O_5$;
X is at least one selected from LiCl and $Li_2SO_4$;
$0.4<a<0.55$; $0.4<b<0.55$; $0.02<c<0.05$; $a+b+c=1$, and $0 \leq d<0.2$.

2. The solid electrolyte according to claim 1, wherein a is in the range of 0.45 to 0.52, b is in the range of 0.45 to 0.52, c is in the range of 0.03 to 0.04, and d is in the range of 0.001 to 0.15.

3. A lithium battery using a solid electrolyte comprising a composition represented by Formula 1 below:

$$aLi_2O\text{-}bB_2O_3\text{-}cM\text{-}dX \qquad (1)$$

wherein M is at least one selected from the group consisting of $TiO_2$, $V_2O_5$, $WO_3$, and $Ta_2O_5$;
X is at least one selected from LiCl and $Li_2SO_4$;
$0.4<a<0.55$; $0.4<b<0.55$; $0.02<c<0.05$; $a+b+c=1$, and $0 \leq d<0.2$.

4. A thin film battery using a solid electrolyte comprising a composition represented by Formula 1 below:

$$aLi_2O\text{-}bB_2O_3\text{-}cM\text{-}dX \qquad (1)$$

wherein M is at least one selected from the group consisting of $TiO_2$, $V_2O_5$, $WO_3$, and $Ta_2O_5$;
X is at least one selected from LiCl and $Li_2SO_4$;
$0.4<a<0.55$; $0.4<b<0.55$; $0.02<c<0.05$; $a+b+c=1$, and $0 \leq d<0.2$.

5. A method for preparing a solid electrolyte comprising a composition represented by Formula 1 below:

$$aLi_2O\text{-}bB_2O_3\text{-}cM\text{-}dX \qquad (1)$$

wherein M is at least one selected from the group consisting of $TiO_2$, $V_2O_5$, $WO_3$, and $Ta_2O_5$;
X is at least one selected from LiCl and $Li_2SO_4$;
$0.4<a<0.55$; $0.4<b<0.55$; $0.02<c<0.05$; $a+b+c=1$, and $0 \leq d<0.2$,
the method comprising:
(a) mixing a $Li_2O$ precursor compound; $B_2O_3$; and at least one compound selected from the group consisting of $TiO_2$, $V_2O_5$, $WO_3$, and $Ta_2O_5$, followed by milling;
(b) heating the resultant powder mixture so that the $Li_2O$ precursor compound is thermally decomposed into $Li_2O$;
(c) heating the resultant mixture to obtain a uniformly molten glass; and
(d) quenching the molten glass to obtain a glassy solid electrolyte.

6. The method according to claim 5, further comprising adding at least one selected from LiCl and $Li_2SO_4$ to the mixture of step (a).

7. The method according to claim 5, wherein in step (b), $Li_2O$ is decomposed from the $Li_2O$ precursor compound at a temperature of 600 to 800° C.

8. The method according to claim 5, wherein in step (c), the molten glass is obtained at a temperature of 900 to 1,500° C.

9. The method according to claim 5, wherein in step (d), the molten glass is quenched at a temperature of 0 to 25° C.

* * * * *